United States Patent
Gatellier et al.

(10) Patent No.: US 6,827,059 B2
(45) Date of Patent: Dec. 7, 2004

(54) FUEL INJECTION METHOD FOR HIGH INJECTION SENSITIVITY INTERNAL-COMBUSTION ENGINE AND ENGINE USING SUCH A METHOD

(75) Inventors: Bertrand Gatellier, Bougival (FR); Bruno Walter, La Garenne Colombes (FR)

(73) Assignee: Institut Francais Du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/391,786

(22) Filed: Mar. 20, 2003

(65) Prior Publication Data

US 2003/0183196 A1 Oct. 2, 2003

(30) Foreign Application Priority Data

Mar. 28, 2002 (FR) .............................. 02 03925

(51) Int. Cl.⁷ .................................. F02B 3/00
(52) U.S. Cl. ................ 123/276; 123/295; 123/305
(58) Field of Search ............................ 123/276, 279, 123/298, 305

(56) References Cited

U.S. PATENT DOCUMENTS

| 4,446,830 | A | 5/1984 | Simko |
|---|---|---|---|
| 4,473,046 | A | 9/1984 | Aoyama |
| 4,858,578 | A | 8/1989 | Schereer |
| 5,373,820 | A | 12/1994 | Sakamoto |
| 5,392,745 | A | 2/1995 | Beck |
| 5,875,743 | A | 3/1999 | Dickey |
| 5,906,183 | A | 5/1999 | Echtle |
| 6,637,403 | B2 * | 10/2003 | Walter et al. ............... 123/299 |
| 6,640,772 | B2 * | 11/2003 | Gatellier et al. ............ 123/298 |
| 6,691,670 | B1 * | 2/2004 | Gatellier et al. ............ 123/298 |
| 2003/0019466 | A1 * | 1/2003 | Walter et al. ............... 123/299 |
| 2003/0172902 | A1 * | 9/2003 | Gatellier et al. ............ 123/298 |

FOREIGN PATENT DOCUMENTS

| DE | 1055873 | 4/1959 |
|---|---|---|
| JP | 03149315 | 6/1991 |

* cited by examiner

Primary Examiner—Thomas N Moulis
(74) Attorney, Agent, or Firm—Antonelli, Terry, Stout & Kraus, LLP

(57) ABSTRACT

Method for injecting fuel into the combustion chamber of a direct-injection internal-combustion engine, said chamber being delimited by the wall of a cylinder (10), a cylinder head (12) and a piston (22) comprising a bowl (26) inside which a teat (28) is arranged. According to the invention, the fuel is injected by means of an injection nozzle (24) allowing to obtain an engine injection sensitivity greater than or equal to 380 mm³/30 s and having a nappe angle ($a_1$) less than or equal to $$2 Arctg \frac{CD}{2F},$$

where CD is the diameter of cylinder (10) and F the distance between the point of origin of the fuel jets and the position of the piston corresponding to a crankshaft angle of 50° in relation to the top dead center (TDC).

10 Claims, 3 Drawing Sheets

FUEL INJECTION METHOD FOR HIGH INJECTION SENSITIVITY INTERNAL-COMBUSTION ENGINE AND ENGINE USING SUCH A METHOD

FIELD OF THE INVENTION

The present invention relates to a method for injecting fuel into the combustion chamber of a direct-injection internal-combustion engine, notably of Diesel type, comprising a fuel injection nozzle allowing to obtain a high engine injection sensitivity.

The invention also relates to an internal-combustion engine using such a method.

BACKGROUND OF THE INVENTION

As it is generally admitted by specialists, comparison of engines with different capacities and injection systems is generally made by means of the following formulation allowing to determine the injection sensitivity (in mm³/30 s) of the engine:

$$\text{Sensitivity} = \text{Permeability} \times \frac{50}{\text{Power}} \times \frac{\sqrt{P\_inj - 50}}{1300} \times \frac{0.5}{L\_cyl}$$

where Permeability represents the permeability of the injection nozzle (in mm³/30 s), Power the power per liter of the engine (in kW/l), L_cyl the capacity of the engine (in liters) and P_inj the maximum pressure of the injection system (in bar).

Selection of this sensitivity results from a compromise between the performance requirements at full load (torque and power) and the pollution requirements at partial loads.

An engine having a sensitivity value below 380 mm³/30 s is thus generally used to take account of the constraints linked with the pollution regulations and to provide sufficient power.

By way of illustration, FIG. 1 shows the evolution of the power (P) of the engine (in kW/l), laid off as ordinate, as a function of the injection sensitivity (S) of this engine (in mm³/30 s), laid off as abscissa.

It can be seen that, up to point C, the engine power increases substantially linearly with the injection sensitivity increase, then, from point C and up to point D, the power increase of the engine is minimal whereas the injection sensitivity increases significantly and, from point D, the sensitivity increases whereas the engine power decreases.

At partial loads, as it has been proved on many occasions, an increase in the injection sensitivity leads to an increase in emissions (NOx, particles and CO).

As regards pollutants, again by way of example, FIG. 2 shows the evolution of emissions (E) in g/kWh (NOx/10 or particles), laid off as ordinate, as a function of the injection sensitivity (S), laid off as abscissa, on a working point representative of urban driving conditions.

It can be observed that, for an injection sensitivity increasing by about 40 mm³/30 s from point A to point B, an emissions increase of the order of 0.15 g/kW is obtained and, beyond this point B, emissions increase very significantly.

FIG. 3 shows the evolution of the injection sensitivity on a graph where the emissions (E) at partial loads (NOx/10 or particles) are laid off as abscissa and the power (P) of the engine as ordinate. It can be seen that, to comply with the pollution regulations, the injection sensitivity has to be maintained below 380 mm³/30 s, which corresponds to point G in this graph.

SUMMARY OF THE INVENTION

In order to overcome the aforementioned drawbacks and notably the compromise between anti-pollution regulations and engine performance (power and torque), the applicant has developed a fuel injection method allowing to obtain a substantial engine power increase while significantly decreasing emissions.

This engine runs in two combustion modes. A conventional Diesel type combustion mode, with fuel injection around the combustion top dead center and diffusion combustion, which is preferably used at high loads.

By changing the injection strategy, the engine runs in another combustion mode, referred to as homogeneous mode, which is used at low loads.

The invention thus relates to a method for injecting fuel into the combustion chamber of a direct-injection internal-combustion engine, said chamber being delimited by the wall of a cylinder, a cylinder head and a piston comprising a bowl inside which a teat is arranged, characterized in that the fuel is injected by means of an injection nozzle allowing to obtain an engine injection sensitivity greater than or equal to 380 mm³/30 s and having a nappe angle less than or equal to $$2 Arctg \frac{CD}{2F},$$

where CD is the diameter of the cylinder and F is the distance between the point of origin of the fuel jets and the position of the piston corresponding to a crankshaft angle of 50° in relation to the top dead center (TDC).

Advantageously, the sensitivity can range between 380 and 520 mm³/30 s.

The fuel can be injected with a fuel jet nappe angle less than or equal to 120°.

The fuel can be injected with a nappe angle ranging between 40° and 100°.

The invention also relates to an internal-combustion engine comprising at least a cylinder, a cylinder head, a piston sliding in this cylinder, a fuel injection nozzle and a combustion chamber delimited on one side by the upper face of the piston comprising a teat pointing towards the cylinder head and arranged in a bowl, characterized in that this engine comprises a fuel injection nozzle allowing to obtain an injection sensitivity greater than or equal to 380 mm³/30 s and having a nappe angle less than or equal to $$2 Arctg \frac{CD}{2F},$$

where CD is the diameter of the cylinder and F is the distance between the point of origin of the fuel jets from the injection nozzle and the position of the piston corresponding to a crankshaft angle of 50° in relation to the top dead center (TDC).

The nappe angle of the injection nozzle can be selected between 0° and 120°, preferably between 40° and 100°.

The angle at the vertex of the teat can be selected greater than the nappe angle by a value ranging between 0° and 30°.

The axes of the fuel jets can form an angle of intersection of the order of 5° with the flank of the teat.

The bowl can have an inclined lateral wall and the angle of inclination of this wall is less than 45°.

BRIEF DESCRIPTION OF THE FIGURES

Other features and advantages of the invention will be clear from reading the description hereafter, given by way of non limitative example, with reference to the accompanying drawings wherein.

DETAILED DESCRIPTION

Figure 1:
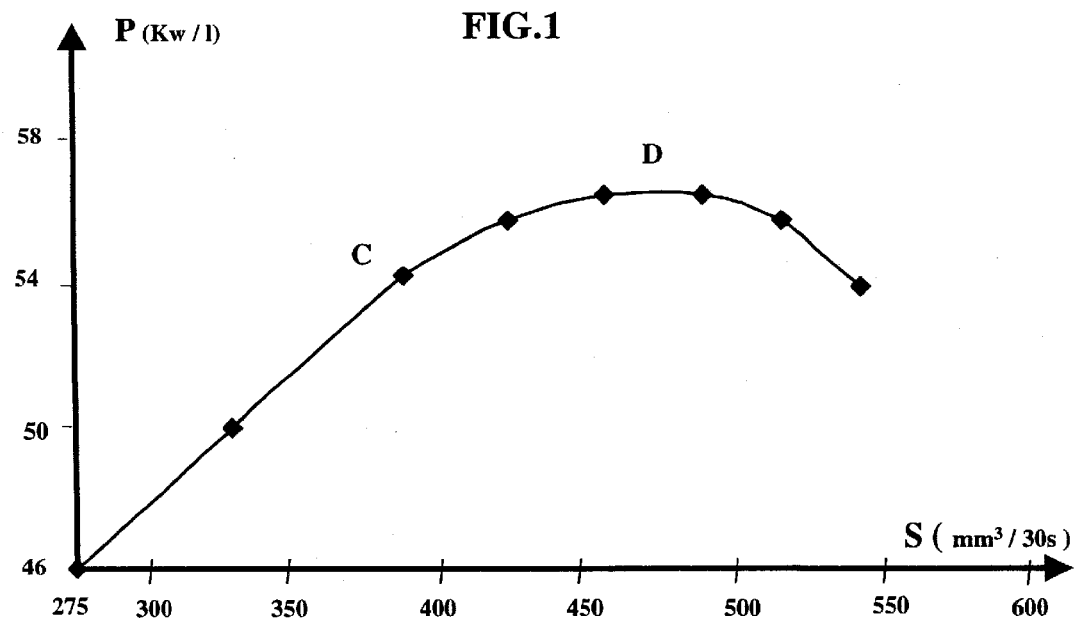
FIG. 1 shows the evolution of power of an engine as a function of the injection sensitivity.
Figure 2:
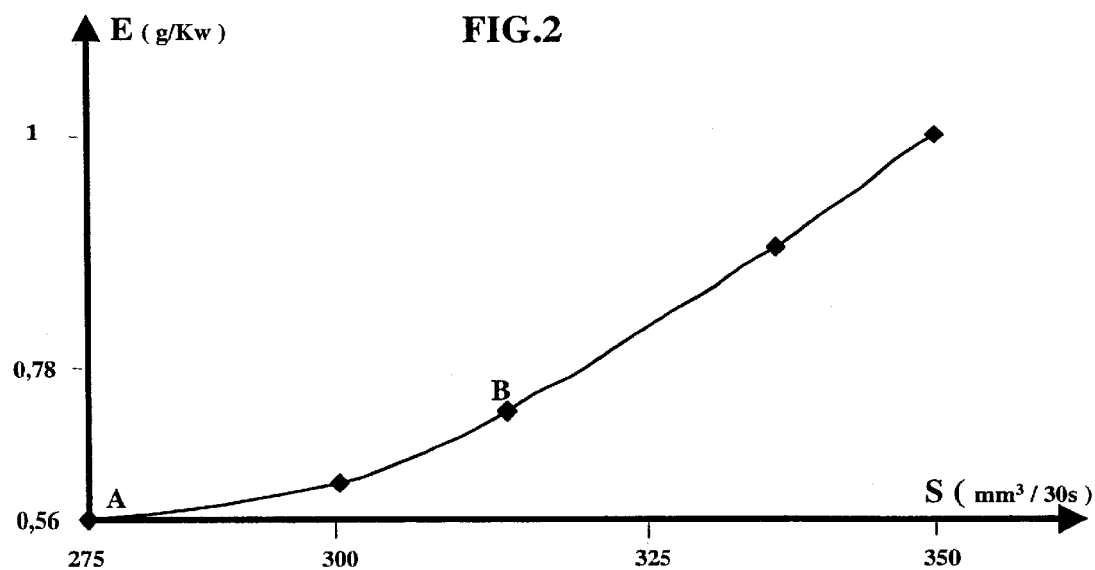
FIG. 2 shows the evolution of emission as a function of sensitivity on a working point representative of urban driving conditions.
Figure 3:
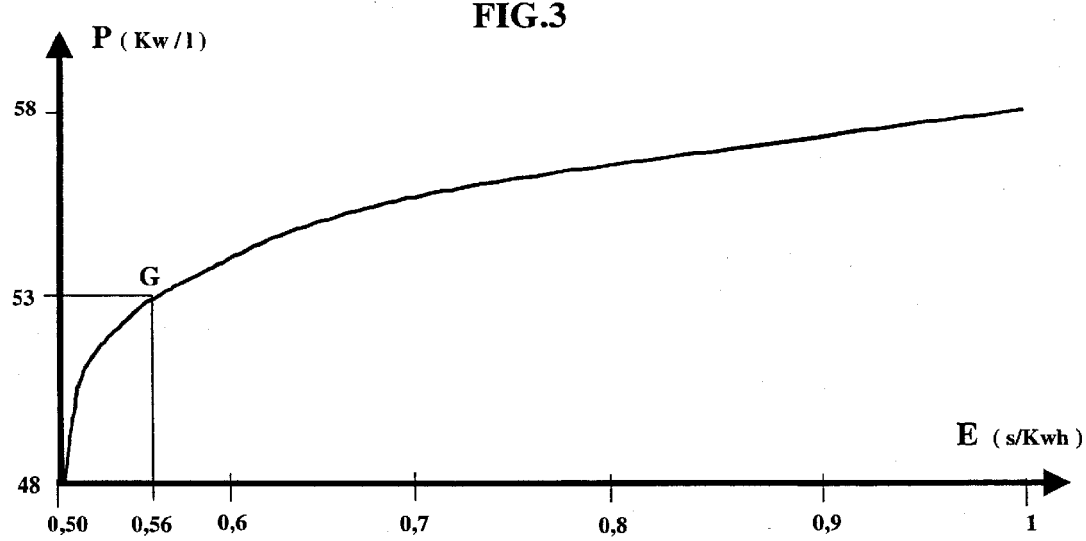
FIG. 3 shows the evolution of injection sensitivity on a graph of power of the engine as a function of emission at partial loads.
Figure 4:
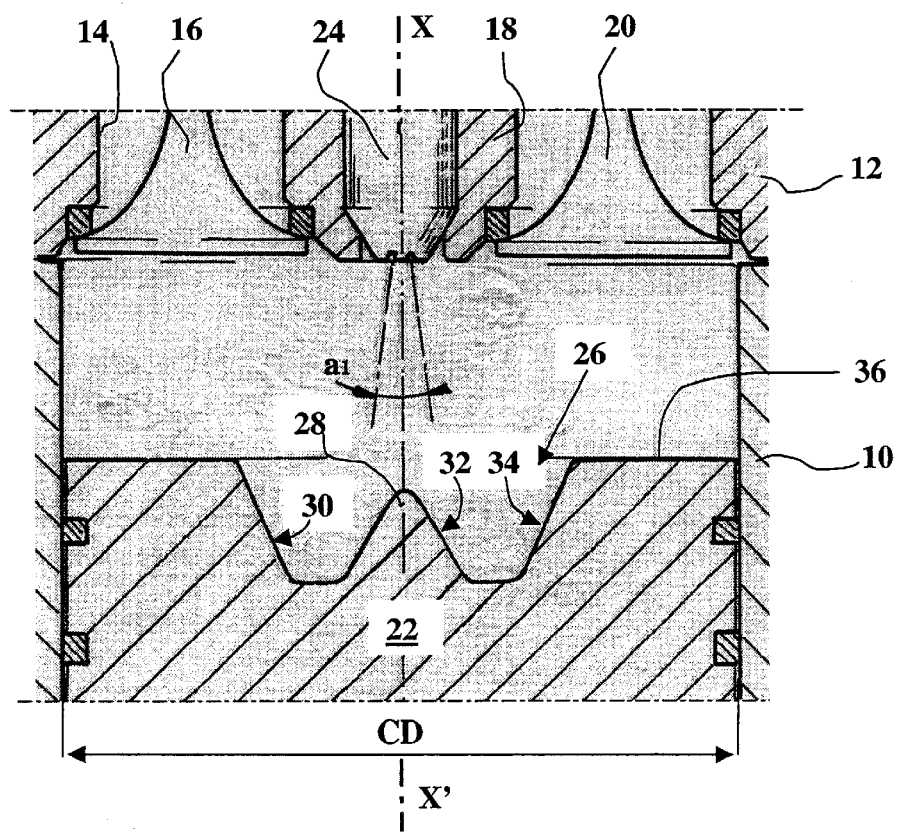
FIG. 4 shows a partial axial section of a direct-injection internal-combustion engine using the method according to the invention.

FIG. 4 shows an internal-combustion engine, notably of Diesel type. This engine comprises at least a cylinder 10 of axis XX' and of diameter CD, a cylinder head 12, at least an intake manifold 14 for at least one gaseous fluid such as air or a mixture of recirculated exhaust gas (EGR) and air, whose opening or closing is controlled by a means such as an intake valve 16, at least a burnt gas exhaust manifold 18, whose opening or closing is also controlled by a means such as an exhaust valve 20, a piston 22 sliding in cylinder 10 and a fuel-injection nozzle 24, preferably of multijet type, which sprays the fuel into the combustion chamber of the engine.

The combustion chamber is thus delimited by the inner face of cylinder head 12, the circular wall of cylinder 10 and the upper face of piston 22.

This upper face of the piston comprises a concave bowl 26 inside which a teat 28 pointing towards cylinder head 12 and arranged at the center of this bowl is housed.

Teat 28, generally truncated, comprises a preferably rounded vertex extended, in the direction of the bottom 30 of the bowl, by a substantially rectilinear inclined flank 32, then, from this bottom, by a substantially rectilinear inclined lateral wall 34 that joins a substantially horizontal surface 36 of the upper face of the piston.

The fuel-injection nozzle is of the type with a small nappe angle $a_1$ and it is so selected that the wall of cylinder 10 is never wetted by the fuel for any position of the piston ranging between +50° and +α or between −50° and −α, where α represents the crankshaft angle for the injection phase selected in relation to the top dead center (TDC), this angle α being greater than 50° and less than or equal to 180° to obtain a homogeneous type combustion.

If CD represents the diameter (in mm) of cylinder 10 and F the distance (in mm) between the point of origin of the fuel jets and the position of the piston corresponding to a crankshaft angle of 50°, nappe angle $a_1$ (in degrees) will be less than or equal to $$2 Arctg \frac{CD}{2F}.$$

The nappe angle is understood to be the angle at the vertex formed by the cone from injection nozzle 24 and whose fictitious peripheral wall passes through all the axes of the fuel jets.

A typical angle range for nappe angle $a_1$ is at the most 120° and it preferably ranges between 40° and 100°.

Advantageously, the angle at the vertex of the teat is selected so as to be greater than nappe angle $a_1$ of the fuel jets by a value ranging between 0° and 30°, and the angle of inclination of lateral wall 34 of bowl 26 is less than 45°.

The axes of the fuel jets preferably form an angle of intersection of the order of 5° with flank 32 of teat 28.

The angle at the vertex of teat 28 and the angle of inclination of lateral wall 34 of bowl 26 are substantially suited to nappe angle $a_1$ of the fuel jets so that the fuel is injected substantially along flank 32 of the teat, then it flows back along lateral wall 34.

In the example shown, the general axis of bowl 26, the axis of injection nozzle 24 and the axis of teat 28 merge with axis XX' of the cylinder but, of course, the axes of the bowl, of the injection nozzle and of the teat may not be coaxial to that of the cylinder, the main thing being an arrangement such that the general axis of the fuel jet nappe from injection nozzle 24, the axis of teat 28 and the axis of bowl 26 are coaxial.

To achieve combustion, the fuel is injected into the combustion chamber with an injection nozzle comprising a small nappe angle as defined above, and the injection nozzle is so designed that the injection sensitivity of the engine is greater than or equal to 380 mm³/30 s.

The injection method combining a high injection sensitivity and a small nappe angle allows to increase the engine power and to decrease emissions at partial loads.

Figure 5:
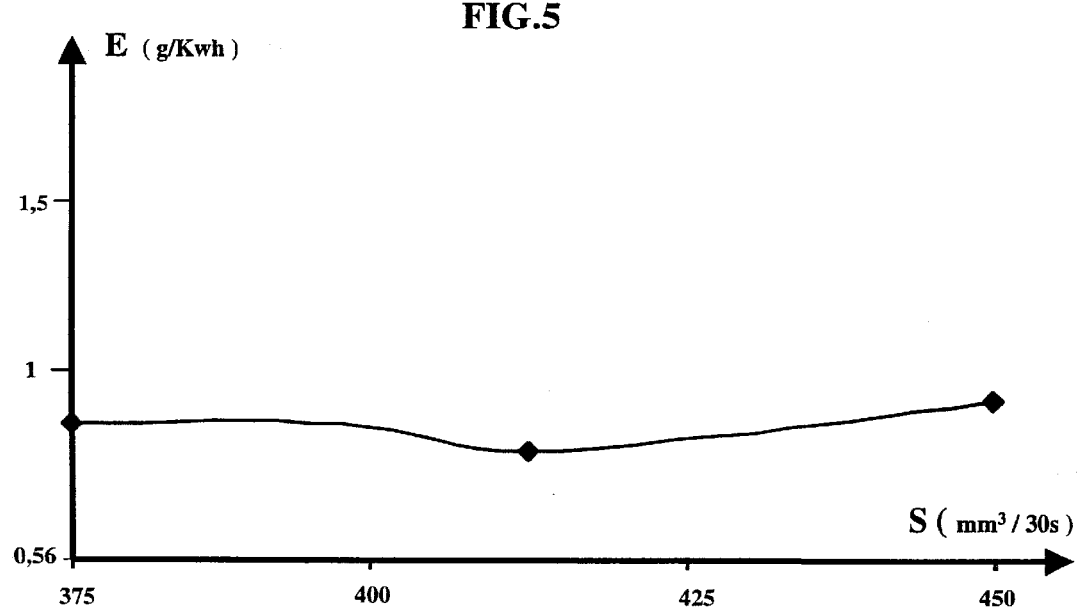
FIG. 5 is a graph showing the evolution of the emissions as a function of the injection sensitivity, according to the method of the invention.

By means of the combustion process and as can be seen in FIG. 5, where the evolution of the emissions (E) (NOx/10 or particles), laid off as ordinate, is shown as a function of the injection sensitivity (S), laid off as abscissa, it can be observed that the increase of the injection sensitivity value above 380 mm³/30 s does not significantly increase the emissions.

It is therefore possible to select an injection sensitivity value as a function only of the full load requirements, i.e. much beyond 380 mm³/30 s.

Figure 6:
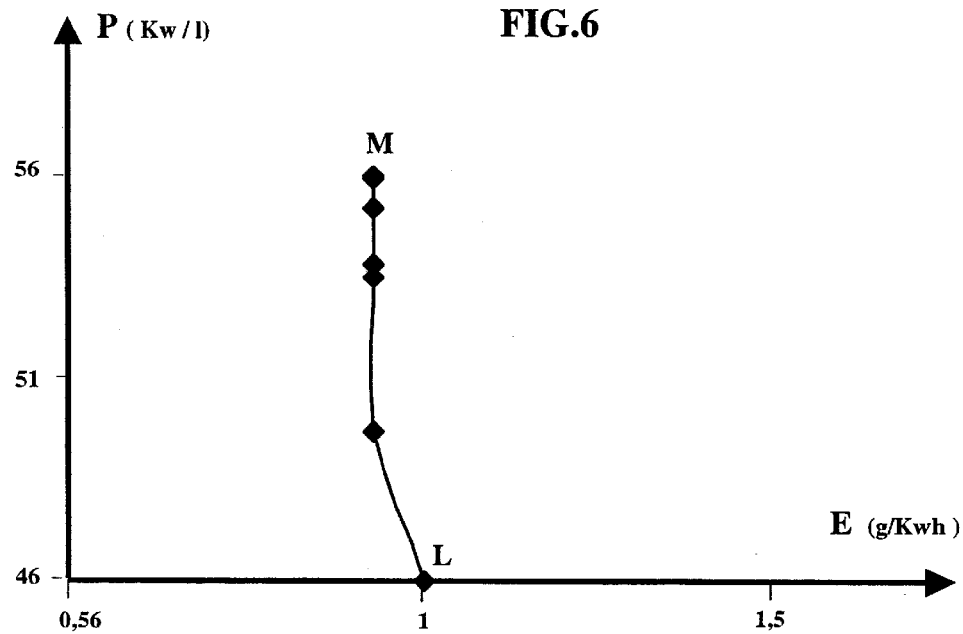
FIG. 6 is another graph showing the evolution, according to the invention, of the injection sensitivity as a function of the emissions and the engine power.

Similarly, as can be seen in FIG. 6, which is a curve showing the evolution of the injection sensitivity where the emissions (E) at partial loads (NOx/10 or particles) are laid off as abscissa and the engine power (P) is laid off as ordinate, for an injection sensitivity of the engine increasing from 380 mm³/30 s to 520 mm³/30 s from point L to point M, an engine power increase of the order of 10 kW/l is obtained without a significant emissions increase.

What is claimed is:

1. A method for injecting fuel into the combustion chamber of a direct-injection internal-combustion engine, said chamber being delimited by the wall of a cylinder (10), a cylinder head (12) and a piston (22) comprising a bowl (26) inside which a teat (28) is arranged, characterized in that the fuel is injected by means of an injection nozzle (24) allowing to obtain an engine injection sensitivity greater than or equal to 380 mm³/30 s and having a nappe angle ($a_1$) less than or equal to $$2 Arctg \frac{CD}{2F},$$

where CD is the diameter of cylinder (10) and F is the distance between the point of origin of the fuel jets and the position of the piston corresponding to a crankshaft angle of 50° in relation to the top dead center (TDC).

2. A method as claimed in claim 1, characterized in that the sensitivity ranges between 380 and 520 mm³/30 s.

3. A method as claimed in claim 1, characterized in that the fuel is injected with a fuel jet nappe angle ($a_1$) less than or equal to 120°.

4. A method as claimed in claim 3, characterized in that the fuel is injected with a nappe angle ($a_1$) ranging between 40° and 100°.

5. An internal-combustion engine comprising at least a cylinder (10), a cylinder head (12), a piston (22) sliding in this cylinder, a fuel injection nozzle (24) and a combustion chamber delimited on one side by the upper face of piston (22) comprising a teat (28) pointing towards cylinder head (12) and arranged in a bowl (26), characterized in that this engine comprises a fuel injection nozzle (24) allowing to obtain an injection sensitivity greater than or equal to 380 mm³/30 s and having a nappe angle ($a_1$) less than or equal to $$2 Arctg \frac{CD}{2F},$$

where CD is the diameter of cylinder (10) and F is the distance between the point of origin of the fuel jets from injection nozzle (24) and the position of the piston corresponding to a crankshaft angle of 50° in relation to the top dead center (TDC).

6. An engine as claimed in claim 5, characterized in that nappe angle ($a_1$) of injection nozzle (24) is selected between 0° and 120°.

7. An engine as claimed in claim 6, characterized in that nappe angle ($a_1$) of injection nozzle (24) is selected between 40° and 100°.

8. An engine as claimed in claim 5, characterized in that the angle at the vertex of teat (28) is selected greater than nappe angle ($a_1$) by a value ranging between 0° and 30°.

9. An engine as claimed in claim 5, characterized in that the axes of the fuel jets form an angle of intersection of the order of 5° with flank (32) of teat (28).

10. An engine as claimed in claim 5 wherein bowl (26) comprises an inclined lateral wall (34), characterized in that the angle of inclination of wall (34) is less than 45°.

* * * * *